(12) United States Patent
Fukuda

(10) Patent No.: US 8,290,466 B2
(45) Date of Patent: Oct. 16, 2012

(54) COMMUNICATION SYSTEM, COMMUNICATION DEVICE, COMMUNICATION TERMINAL, AND COMMUNICATION SETTING METHOD

(75) Inventor: Satoru Fukuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 466 days.

(21) Appl. No.: 12/528,412

(22) PCT Filed: Jan. 22, 2008

(86) PCT No.: PCT/JP2008/050742
§ 371 (c)(1),
(2), (4) Date: Aug. 24, 2009

(87) PCT Pub. No.: WO2008/105196
PCT Pub. Date: Sep. 4, 2008

(65) Prior Publication Data
US 2010/0080306 A1    Apr. 1, 2010

(30) Foreign Application Priority Data

Feb. 28, 2007 (JP) .................................. 2007-049237

(51) Int. Cl.
*H04M 9/00* (2006.01)
(52) U.S. Cl. ....................................... 455/402; 455/420
(58) Field of Classification Search .................. None
See application file for complete search history.

(56) References Cited

U.S. PATENT DOCUMENTS

| | | | |
|---|---|---|---|
| 7,756,942 B2 * | 7/2010 | Iwamura ........................ | 709/209 |
| 2002/0126000 A1 | 9/2002 | Shintani et al. | |
| 2003/0107471 A1 | 6/2003 | Tsubone | |
| 2005/0047379 A1 * | 3/2005 | Boyden et al. ................ | 370/338 |
| 2007/0226779 A1 * | 9/2007 | Yokomitsu et al. ............... | 726/2 |

FOREIGN PATENT DOCUMENTS

| | | |
|---|---|---|
| JP | 8-223161 A | 8/1996 |
| JP | 2002-325079 A | 11/2002 |
| JP | 2004-194264 A | 7/2004 |
| JP | 2004-222312 A | 8/2004 |
| JP | 2004-364147 A | 12/2004 |
| JP | 2006-166273 A | 6/2006 |
| JP | 2006-186579 A | 7/2006 |
| WO | WO-02/45458 A1 | 6/2002 |

\* cited by examiner

*Primary Examiner* — Erika Gary
(74) *Attorney, Agent, or Firm* — Birch, Stewart, Kolasch & Birch, LLP

(57) ABSTRACT

A communication device that can easily be added to a network is provided. Processing performed by the communication device for which manipulation for joining a communication network was performed includes the steps of the communication device sensing manipulation of a manipulation panel, performing network detection processing when there is a network that has already been registered, performing pairing processing when there is no registered network, and starting a master operation when there is no registered network.

10 Claims, 14 Drawing Sheets

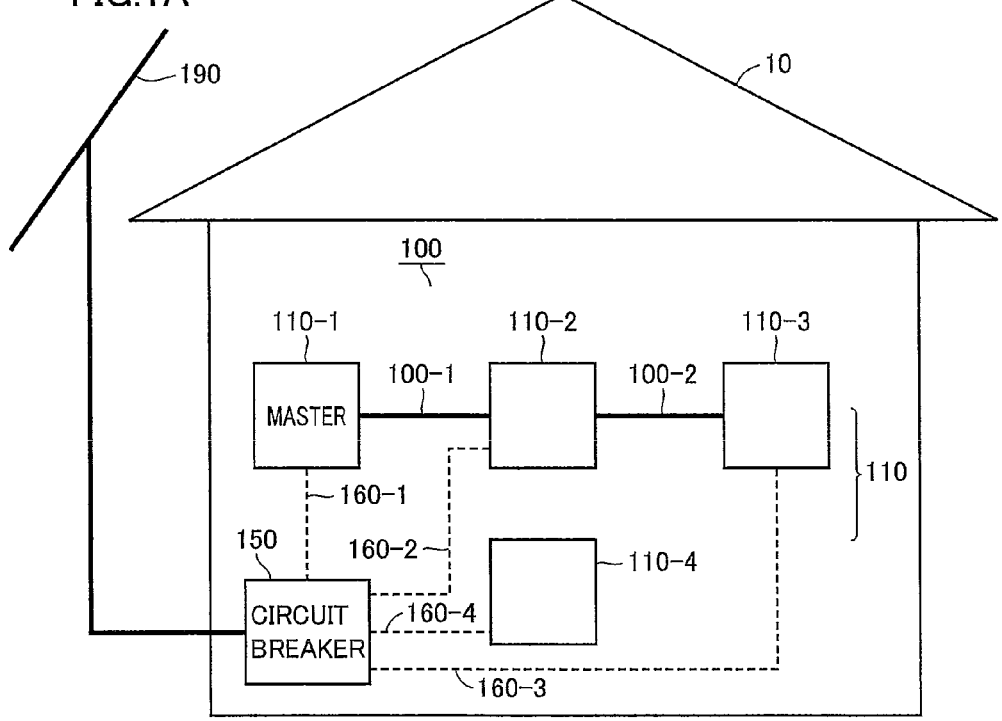
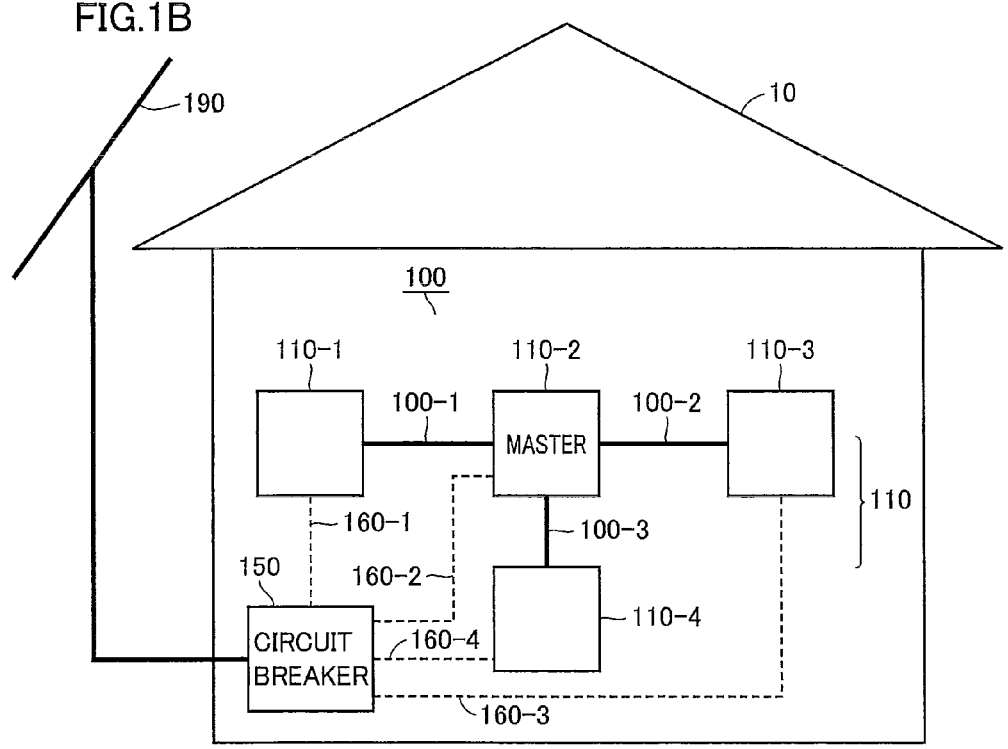

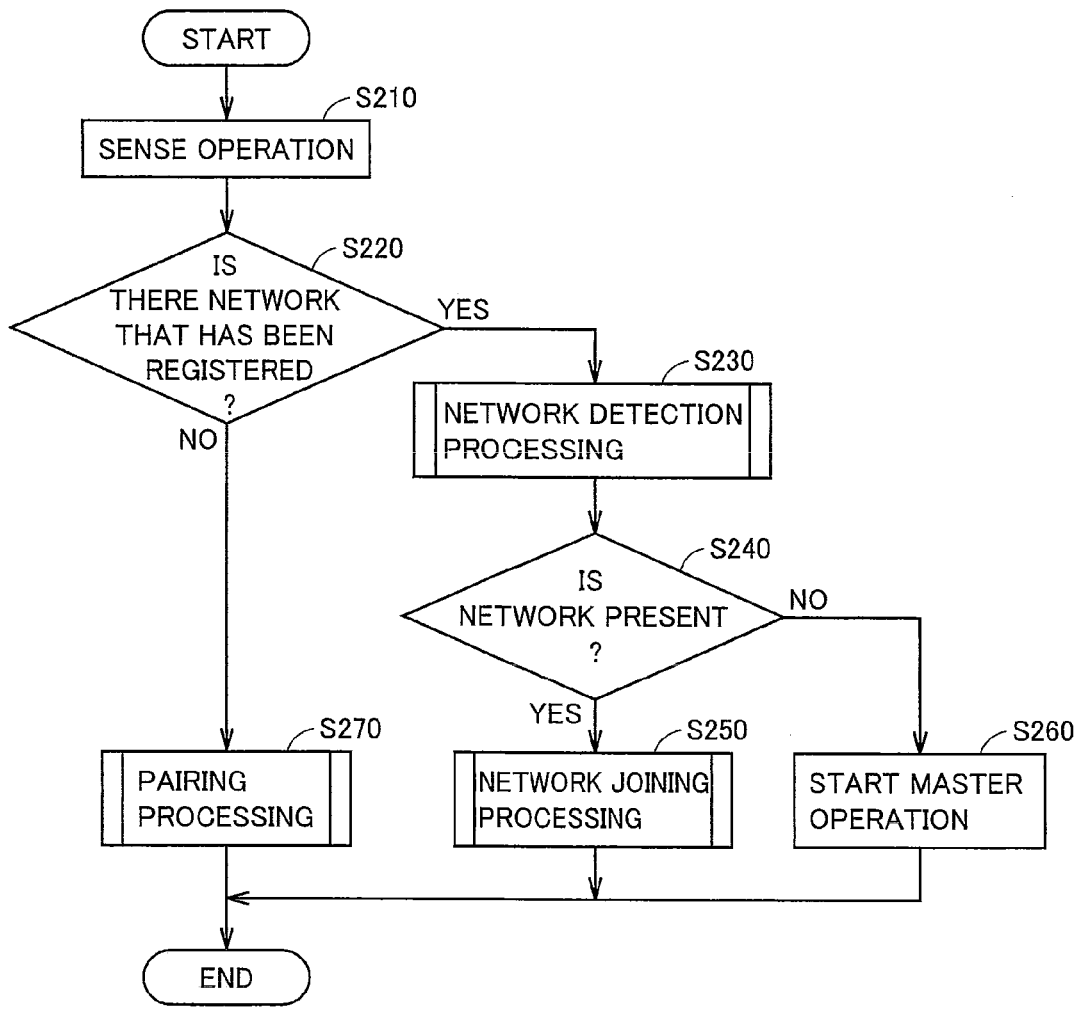

COMMUNICATION SYSTEM, COMMUNICATION DEVICE, COMMUNICATION TERMINAL, AND COMMUNICATION SETTING METHOD

TECHNICAL FIELD

The present invention relates to a network over which communication is established through a power line as a medium, and more particularly to a technique for adding a communication device to a network.

BACKGROUND ART

In a network where a power line is used as a communication medium, information is carried on the power line. Therefore, when network communication through the power line is used in an office or an apartment house in a business complex or an apartment, there is a problem that an unintended terminal joins the network and intercepts communication, and hence security should be reinforced.

Regarding a technique for reinforcing security, for example, Japanese Patent Laying-Open No. 2002-325079 (Patent Document 1) or Japanese Patent Laying-Open No. 2004-222312 (Patent Document 2) discloses a technique for encrypting communication by sharing an encryption key (house code).

In addition, Japanese Patent Laying-Open No. 2006-166273 (Patent Document 3) discloses a management method for reinforcing security such that a head end portion (corresponding to CCo in the present invention) provides an encryption key to an authorized terminal device to prevent connection of an unauthorized terminal.

Meanwhile, Japanese Patent Laying-Open No. 2004-194264 (Patent Document 4) discloses a technique for permitting automatic plug-in of new equipment to a network when the new equipment is added to a network system.

Patent Document 1: Japanese Patent Laying-Open No. 2002-325079
Patent Document 2: Japanese Patent Laying-Open No. 2004-222312
Patent Document 3: Japanese Patent Laying-Open No. 2006-166273
Patent Document 4: Japanese Patent Laying-Open No. 2004-194264

DISCLOSURE OF THE INVENTION

Problems to be Solved by the Invention

In general, when new equipment is added to a network system, a manager of the system or other network users should manipulate equipment having a function to manage an encryption key and other network information (hereinafter referred to as a "master device"), for adding the new equipment to the network.

For example, when a network is constituted of a plurality of pieces of equipment, the equipment to function as the master device is not fixed and the user should find the equipment functioning as the master device. If power supply to the equipment functioning as the master device is cut off due to power failure or unintended switch-off, other equipment may also automatically function as the master device.

In such a case, when the network is constituted of a large number of pieces of equipment, it is difficult for the user to check a state of each piece of equipment and to find the master device. For example, when the master device is located at a place distant from equipment of which addition to the network is desired, manipulation for adding the equipment becomes further difficult.

The present invention was made to solve the above-described problems, and an object of the present invention is to provide a communication system readily allowing addition of a communication device to a communication network using a power line.

Another object is to provide a communication device or a communication terminal that can readily be added to a communication network using a power line.

Yet another object is to provide a communication setting method for readily making setting for causing a communication system to function as a communication network using a power line.

Means for Solving the Problems

In order to solve the above-described problems, a communication system according to one aspect of the present invention includes a communication device and a communication terminal connected to the communication device through a power line. The communication device includes a first communication unit for transmitting and receiving a signal, a detection unit for detecting equipment functioning as a master device for controlling communication over a communication network through the power line based on communication with the communication terminal, and a first pairing unit for performing pairing processing for establishing a communication network between the communication device and the communication terminal based on a result of detection by the detection unit. The communication terminal includes a second communication unit for transmitting and receiving a signal and a second pairing unit for performing the pairing processing in accordance with a result of communication with the communication device.

Preferably, the detection unit includes a request unit for requesting master data indicative of functioning as the master device from the communication terminal, and a first checking unit for checking whether the master data was received from the communication terminal or not. The communication terminal further includes a second checking unit for checking whether the terminal has the master data or not, in response to the request from the communication device. The second communication unit transmits a result of checking by the second checking unit to the communication device.

Preferably, the second communication unit transmits the master data to the communication device when the communication terminal has the master data. The first pairing unit transmits a request for starting the pairing processing to the communication terminal when the master data was received from the communication terminal. The second pairing unit starts the pairing processing based on the request for starting.

Preferably, the master data includes network identification data for identifying the communication network. The communication device further includes a first storage unit for storing first identification data for identifying the communication device. The first pairing unit transmits the first identification data to the communication terminal. The second pairing unit of the communication terminal associates the first identification data and the network identification data with each other.

Preferably, the second communication unit transmits, when the communication terminal does not have the master data, an answer signal indicating that the communication terminal does not have the master data to the communication device. The first pairing unit generates the master data based on reception of the answer signal. The first communication unit transmits the master data to the communication terminal. The communication terminal further includes a sensing unit for sensing that the communication device functions as the master device. The second pairing unit transmits a request for starting the pairing processing to the communication device, based on sensing by the sensing unit.

Preferably, the communication device further includes a first storage unit for storing first identification data for identifying the communication device and network identification data for identifying the communication network. The first pairing unit generates the master data based on the first identification data and the network identification data.

Preferably, the communication terminal further includes a second storage unit for storing second identification data for identifying the communication terminal. The second pairing unit transmits the request for starting and the second identification data to the communication device. The first pairing unit of the communication device associates the second identification data and the network identification data with each other, based on reception of the request for starting.

According to another aspect of the present invention, a communication device capable of communicating with a communication terminal connected to a power line is provided. The communication device includes a communication unit for transmitting and receiving a signal, a detection unit for detecting equipment functioning as a master device for controlling communication over a communication network through the power line based on communication with the communication terminal, and a pairing unit for performing pairing processing for establishing a communication network between the communication device and the communication terminal in accordance with a result of detection by the detection unit.

Preferably, the detection unit includes a request unit for requesting master data indicative of functioning as the master device from the communication terminal, and a checking unit for checking whether the master data was received from the communication terminal or not.

Preferably, the communication terminal is configured to transmit the master data to the communication device when the terminal has the master data and to perform the pairing processing in response to a request from the communication device. The pairing unit transmits a request for starting the pairing processing to the communication terminal when the master data was received from the communication terminal.

Preferably, the master data includes network identification data for identifying the communication network, and the communication terminal is configured to perform the pairing processing by associating the communication device and the network identification data with each other. The communication device further includes a storage unit for storing first identification data for identifying the communication device. The pairing unit transmits the first identification data to the communication terminal.

Preferably, the communication terminal is configured to transmit, when the terminal does not have the master data, an answer signal indicating that the communication terminal does not have the master data and a request for starting the pairing processing to the communication device. The pairing unit generates the master data based on reception of the answer signal. The communication unit transmits the master data to the communication terminal.

Preferably, the communication device further includes a storage unit for storing identification data for identifying the communication device and network identification data for identifying the communication network. The pairing unit generates the master data based on the identification data and the network identification data.

Preferably, the communication terminal has second identification data for identifying the communication terminal and is configured to transmit the request for starting and the second identification data to the communication device. The pairing unit associates the second identification data and the network identification data with each other, based on reception of the request for starting.

According to another aspect of the present invention, a communication terminal capable of communicating with a communication device connected to a power line is provided. The communication device is configured to detect equipment functioning as a master device for controlling communication over a communication network through the power line and to perform pairing processing for establishing a communication network between the communication device and the communication terminal in accordance with a result of detection. The communication terminal includes a communication unit for transmitting and receiving a signal, and a pairing unit for performing the pairing processing based on a result of communication with the communication device.

Preferably, the communication device is configured to request master data indicative of functioning as the master device from the communication terminal and to check whether the master data was received from the communication terminal or not. The communication terminal further includes a checking unit for checking whether the terminal has the master data or not, in response to a request from the communication device. The communication unit transmits a result of checking by the checking unit to the communication device.

Preferably, the communication unit transmits the master data to the communication device when the communication terminal has the master data. The communication device is configured to transmit a request for starting the pairing processing to the communication terminal when the terminal received the master data from the communication terminal. The pairing unit starts the pairing processing based on the request for starting.

Preferably, the master data includes network identification data for identifying the communication network. The communication device has first identification data for identifying the communication device and is configured to transmit the first identification data to the communication terminal. The pairing unit associates the first identification data and the network identification data with each other.

Preferably, the communication unit transmits, when the communication terminal does not have the master data, an answer signal indicating that the communication terminal does not have the master data to the communication device. The communication device is configured to generate the master data and to transmit the master data to the communication terminal based on reception of the answer signal. The communication terminal further includes a sensing unit for sensing that the communication device functions as the master device. The pairing unit transmits a request for starting the pairing processing to the communication device based on sensing by the sensing unit.

Preferably, the communication device has first identification data for identifying the communication device and network identification data for identifying the communication network and is configured to generate the master data based on the first identification data and the network identification data. The communication terminal further includes a storage unit for storing second identification data for identifying the communication terminal. The pairing unit transmits the request for starting and the second identification data to the communication device.

According to another aspect of the present invention, a communication setting method for establishing a communication network between a first communication device and a second communication device connected to the first communication device through a power line is provided. The method includes a detection step of performing processing for detecting a device functioning as a master device for controlling communication over the communication network based on communication by the first communication device with the second communication device through the power line, and a pairing step of performing pairing processing for establishing the communication network between a device functioning as the master device and a device not functioning as the master device, by setting any of the first communication device and the second communication device as the master device in accordance with a result of the processing.

Preferably, the pairing step includes the steps of the first communication device obtaining data for communication through the power line from the second communication device when the second communication device is detected as the device functioning as the master device, and the second communication device registering the first communication device to the communication network.

Preferably, the pairing step includes the step of the first communication device waiting for a request for joining the communication network from the second communication device when the first communication device is detected as the device functioning as the master device.

Preferably, the method further includes a setting step of setting any of the first communication device and the second communication device as the device functioning as the master device when a device functioning as the master device is not detected.

Preferably, the first communication device has setting data for deriving management data for controlling communication over the communication network. The setting step includes the step of the first communication device generating the management data based on the setting data.

Preferably, the communication network further includes a third communication device connected to the power line. The setting step includes the steps of any of the first communication device and the second communication device checking whether the third communication device is the device functioning as the master device or not, any of the first communication device and the second communication device obtaining management data for controlling communication over the communication network from the third communication device when it has been confirmed that the third communication device is the device functioning as the master device, and any device storing the management data.

Preferably, the step of checking includes the steps of any device requesting the management data from the third communication device, and checking whether the management data was received from the third communication device or not.

Effects of the Invention

According to the communication system of the present invention, a communication device can readily be added to a communication network using a power line. According to the communication device or the communication terminal of the present invention, addition thereof to a communication network using a power line is facilitated. According to the communication setting method of the present invention, setting for causing a communication system to function as a communication network using a power line can readily be made.

BRIEF DESCRIPTION OF THE DRAWINGS

FIG. 1A is a diagram illustrating one form of configuring a communication network using a power line in a house.

FIG. 1B is a diagram illustrating another form of configuring a communication network using a power line in a house.

FIG. 2 is a flowchart illustrating a series of operations performed by a communication device for which manipulation for joining a communication network 100 was performed.

Figure 3:
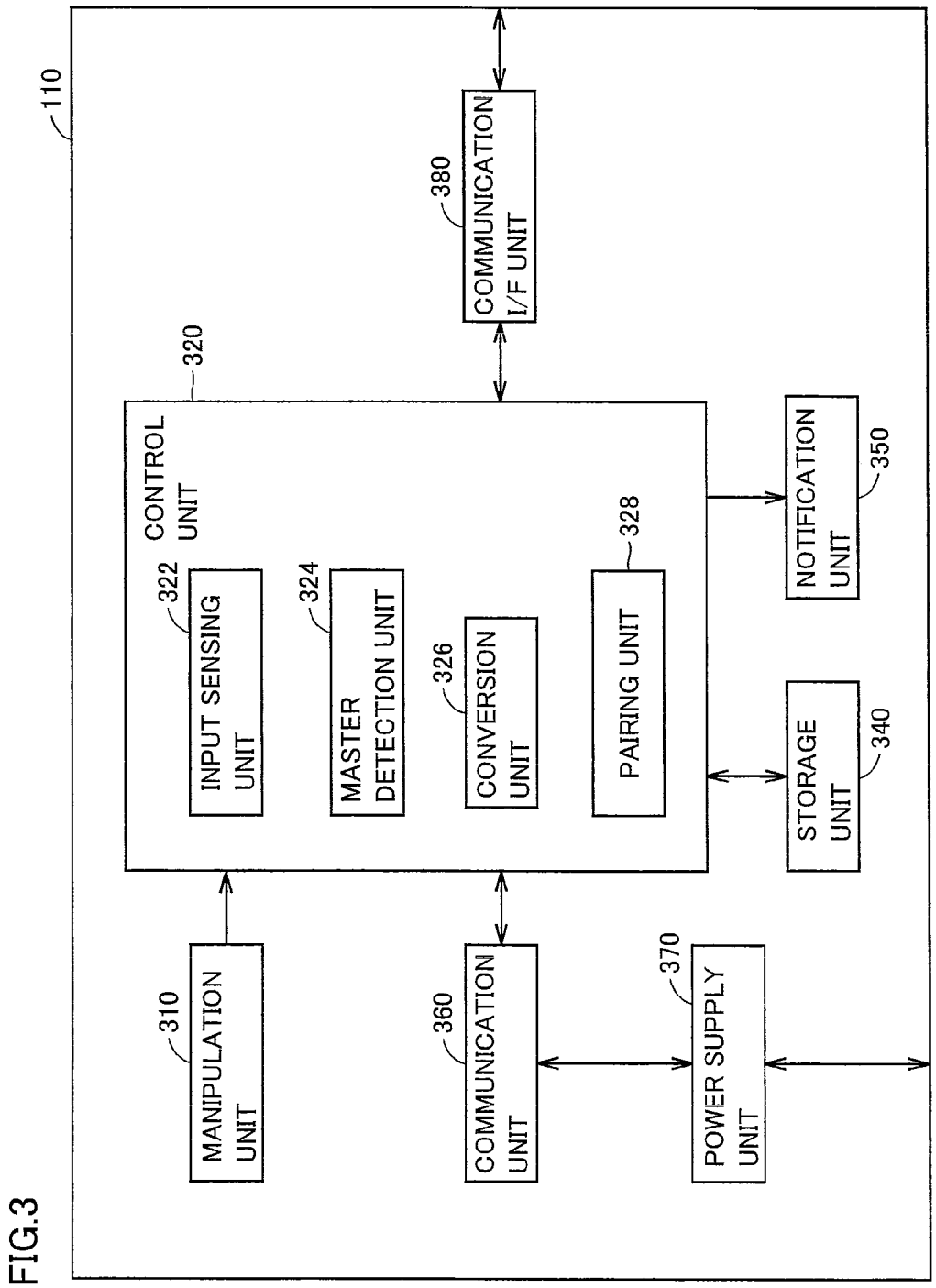
FIG. 3 is a block diagram illustrating a configuration of a function realized by a communication device 110 according to an embodiment of the present invention.

DESCRIPTION OF THE REFERENCE SIGNS 10 house; 100 communication network; 100-1, 100-2, 100-3, 100-4 network; 110, 110-1, 110-2, 110-3, 110-4 communication device; 160-1, 160-2, 160-3, 160-4 power line; 190 electric wire; 480 plug; and 600, 700, 1000, 1300, 1400 frame.

BEST MODES FOR CARRYING OUT THE INVENTION

An embodiment of the present invention will be described hereinafter with reference to the drawings. In the description below, the same elements have the same reference characters allotted. Their label and function are also identical. Therefore, detailed description thereof will not be repeated.

First Embodiment

Initially, referring to FIGS. 1A and 1B, a technical concept according to the present invention will be described. FIGS.

1A and 1B are diagrams each illustrating one form of configuring a communication network using a power line in a house.

As shown in FIG. 1A, a house 10 includes communication devices 110-1, 110-2 and 110-3, and a circuit breaker 150. Communication devices 110-1, 110-2 and 110-3 constitute a communication network 100. Communication device 110-1 and communication device 110-2 are connected to each other through a network 100-1. Communication device 110-2 and communication device 110-3 are connected to each other through a network 100-2.

Circuit breaker 150 is connected to an electric wire 190. Communication devices 110-1, 110-2 and 110-3 are connected to circuit breaker 150 through power lines 160-1, 160-2 and 160-3, respectively.

A communication device 110-4 is a device to newly be added to existing communication network 100. Communication device 110-4 is connected to circuit breaker 150 through a power line 160-4.

Unless circuit breaker 150 cuts off power supply sent through electric wire 190, each of communication devices 110-1, 110-2, 110-3, and 110-4 is connected through each power line 160-n.

Here, in communication network 100, communication device 110-1 functions as a master for controlling communication among the communication devices. In this case, communication device 110-1 holds data indicating that communication device 110-1 itself is the device functioning as the master. The data includes, for example, a flag indicating that this device functions as the master, a key for encrypted communication over communication network 100, and network identification data for identifying communication network 100. On the other hand, other communication devices 110-2 and 110-3 function as slaves.

Here, the master refers to control of communication with other terminals or communication among a plurality of terminals. In addition, the slave refers to a state that an operation thereof is controlled by the master.

Referring to FIG. 1A, an example where communication device 110-4 is added to communication network 100 will be described. Communication device 110-4 is connected to each communication device constituting communication network 100 through power line 160-4. A network is not established between communication device 110-4 and other communication devices 110-1 to 110-3. Then, the user of communication network 100 (for example, a resident in house 10) performs pairing processing between communication device 110-4 and other communication devices constituting communication network 100. For example, if communication device 110-4 and communication device 110-2 are provided in the same room, the resident desires to perform pairing processing between communication device 110-2 and communication device 110-4. Here, the resident performs manipulation for starting the pairing processing between communication device 110-2 and communication device 110-4, so that processing for adding communication device 110-4 to communication network 100 can be implemented.

Specifically, referring to FIG. 1B, the device functioning as the master in communication network 100 is changed from communication device 110-1 to communication device 110-2. Communication device 110-2 functioning as the master transmits and receives data for pairing processing by communicating with communication device 110-4 through power lines 160-2 and 160-4. When communication device 110-4 is permitted to join communication network 100 as a result of transmission and reception, communication device 110-2 functioning as the master stores data for specifying communication device 110-4 in a memory (not shown). Thereafter, communication device 110-4 can communicate with other communication devices 110-1 to 110-3 through power lines 160-1 to 160-4, as a member constituting communication network 100. In addition, when communication device 110-4 has a function for connection to the Internet, communication device 110-4 can also establish Internet communication through circuit breaker 150.

Referring next to FIG. 2, a control structure of a communication device constituting communication network 100 will be described. FIG. 2 is a flowchart illustrating a series of operations performed by a communication device for which manipulation for joining the communication network was performed.

In step S210, communication device 110 senses manipulation of a manipulation panel (not shown). In step S220, communication device 110 checks whether there is a network that has already been registered or not. Specifically, communication device 110 checks whether data for specifying the network is stored in an embedded memory (not shown) or not. When communication device 110 determines that there is a network that has already been registered (YES in step S220), control is switched to step S230. Otherwise (NO in step S220), communication device 110 switches control to step S270.

In step S230, communication device 110 performs network detection processing which will be described later. When this processing is performed, processing for detecting the network confirmed in step S220 as having already been registered is performed.

In step S240, communication device 110 determines whether the network that has already been registered is present or not. When communication device 110 determines that the network is present (YES in step S240), control is switched to step S250. Otherwise (NO in step S240), communication device 110 switches control to step S260.

In step S250, communication device 110 performs network joining processing. Specifically, communication device 110 performs processing for joining the network that has already been registered and confirmed that it is actually present. For example, communication device 110 transmits data for identifying communication device 110 to another communication device functioning as the master in the network and obtains data for communication over the network (for example, an encryption key and network identification data).

In step S260, communication device 110 starts a master operation. Specifically, communication device 110 performs processing for functioning as the master in the network that has been confirmed as currently being present. When this processing is started, communication device 110 transmits the network identification data, the encryption key or the like in response to a request for joining the network sent from another communication device.

In step S270, communication device 110 performs pairing processing for joining the network, between communication device 110 and another communication device.

Referring to FIG. 3, a configuration of communication device 110 will be described. FIG. 3 is a block diagram illustrating a configuration of a function realized by communication device 110.

Communication device 110 includes a manipulation unit 310, a control unit 320, a storage unit 340, a notification unit 350, a communication unit 360, a power supply unit 370, and a communication I/F (Interface) unit 380. Control unit 320 includes an input sensing unit 322, a master detection unit 324, a conversion unit 326, and a pairing unit 328.

Manipulation unit 310 accepts an operation of communication device 110. Manipulation unit 310 emits to control unit 320, a signal in accordance with the operation.

Control unit 320 controls a behavior of communication device 110. Specifically, input sensing unit 322 senses an input of an instruction to communication device 110, based on a signal sent from manipulation unit 310. The instruction includes, for example, an instruction to connect communication device 110 to another communication device.

Master detection unit 324 detects a device functioning as the master in the communication network, based on an output from input sensing unit 322. Specifically, master detection unit 324 generates a request for transmitting data for identifying the master in the communication network and transmits the request to communication unit 360. In addition, master detection unit 324 checks whether the communication device that has transmitted the signal is the device functioning as the master or not, based on the signal sent from communication unit 360. Master detection unit 324 causes storage unit 340 to store the data for specifying the master when the master in the communication network is detected.

Conversion unit 326 converts a signal between communication unit 360 and communication I/F unit 380. Specifically, when the data is provided from communication unit 360 or communication I/F unit 380 to control unit 320, conversion unit 326 converts the signal into a format adapted to processing in control unit 320. In contrast, when the data is emitted from control unit 320 to communication unit 360 or communication I/F unit 380, conversion unit 326 converts the data into a format adapted to processing in communication unit 360 or communication I/F unit 380 and outputs the resultant data. In another aspect, such conversion of data format may be performed by communication unit 360 or communication I/F unit 380.

Pairing unit 328 performs pairing processing between communication device 110 and another communication device. Specifically, pairing unit 328 transmits a pairing request to a device detected by master detection unit 324. Pairing unit 328 receives data sent in response to the pairing request, obtains the network identification data included in that data and other management data (for example, the encryption key), and causes storage unit 340 to store each obtained data.

Storage unit 340 stores the data obtained or generated by control unit 320.

Notification unit 350 notifies the outside of an operation state of communication device 110. In one aspect, notification unit 350 is implemented by an LED (Light Emitting Diode) of which manner of light emission is determined in advance for each operation. The manner of light emission includes a color of illumination, interval of blinking, and the like.

In addition, in another aspect, notification unit 350 is also implemented by a display for displaying characters and other images.

Communication unit 360 transmits and receives a signal between communication device 110 and another communication device. More specifically, communication unit 360 converts digital data sent from control unit 320 to an analog signal and emits the signal to power supply unit 370. In contrast, communication unit 360 converts an analog signal sent from power supply unit 370 to digital data and emits the digital data to control unit 320. Communication unit 360 issues a signal based on digital data generated by master detection unit 324 for sensing the master, to power line 160 to which communication device 110 is connected.

In another aspect, communication unit 360 converts digital data sent from pairing unit 328 into an analog signal and transmits, as the resultant signal, a signal requesting pairing to a destination included in the digital data. In yet another aspect, communication unit 360 transmits an analog signal based on digital data output from conversion unit 326 to power line 160. On the other hand, communication unit 360 converts a signal received from the outside of communication device 110 into digital data and emits the digital data to control unit 320. The emitted digital data includes an answer to a master detection request, an answer to the pairing request (that is, permission or rejection), data for pairing, and a signal sent from another communication device.

Connected to power line 160, power supply unit 370 accepts supply of electric power to communication device 110 and transmits a signal through communication unit 360.

Communication I/F unit 380 is connected to another information communication device and realizes transmission of data between the information communication device and communication device 110. Communication I/F unit 380 is implemented, for example, as an RJ45 connector or another interface.

Figure 4:
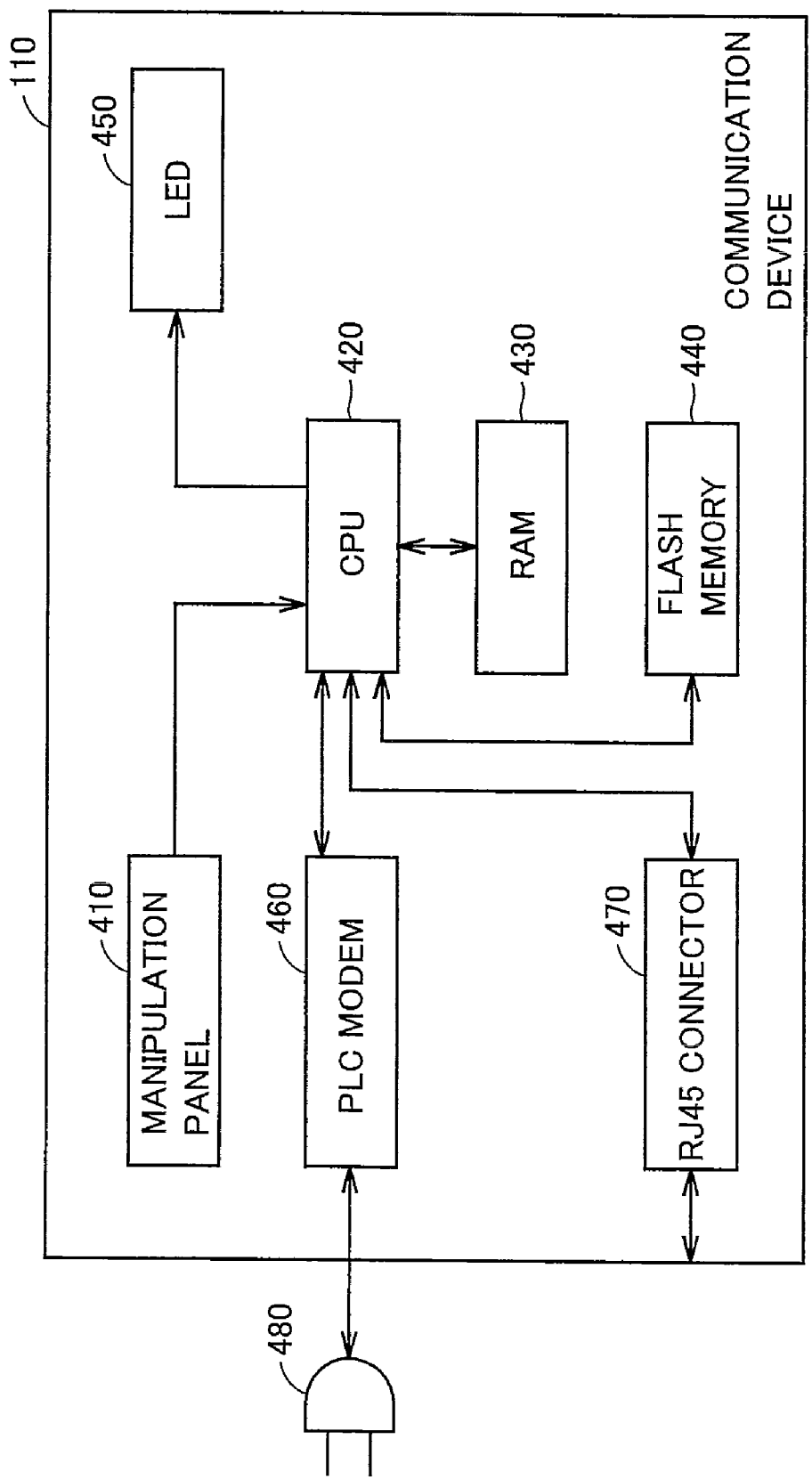
FIG. 4 is a block diagram illustrating a hardware configuration of communication device 110.

Referring next to FIG. 4, a specific configuration of communication device 110 will be described. FIG. 4 is a block diagram illustrating a hardware configuration of communication device 110. Communication device 110 includes a manipulation panel 410, a CPU (Central Processing Unit) 420, a RAM (Random Access Memory) 430, a flash memory 440, an LED 450, a PLC (Power Line Communication) modem 460, an RJ45 connector 470, and a plug 480.

Manipulation panel 410 accepts an operation of communication device 110. Manipulation panel 410 is implemented, for example, by a touch panel, a push-type switch, or a button of another type. Manipulation panel 410 emits a signal in accordance with the operation to CPU 420.

CPU 420 controls an operation of communication device 110. Specifically, CPU 420 performs processing for realizing a specific function of communication device 110 based on a signal provided from manipulation panel 410 or based on a signal externally provided to communication device 110. In another aspect, CPU 420 performs processing for having communication device 110 join the communication network through PLC modem 460 and plug 480. In yet another aspect, CPU 420 realizes communication with another computer connected to communication device 110 through RJ45 connector 470.

RAM 430 temporarily holds data generated by CPU 420 or data provided to communication device 110.

Flash memory 440 stores data or a program provided in advance to communication device 110. In addition, flash memory 440 stores data obtained by CPU 420 from another communication device. The data includes, for example, network identification data for having communication device 110 join the network, an encryption key, and a MAC (Media Access Control) address.

LED 450 emits light based on a signal output from CPU 420. For example, while communication device 110 is performing processing for joining the network, LED 450 blinks in a specific color (for example, green) at intervals set in advance. Alternatively, LED 450 is constantly turned on. In addition, while communication device 110 is performing pairing processing in the communication network, LED 450 emits light in a manner different from the manner described previously (for example, in red). A state of communication device 110 may be indicated by emission of light from LEDs in a plurality of colors.

PLC modem 460 modulates and demodulates data transmitted between CPU 420 and plug 480. PLC modem 460 superimposes data output from CPU 420 on carrier waves and emits the resultant signal to plug 480. In contrast, PLC modem 460 obtains data for communication from the signal sent through plug 480 and emits the obtained data to CPU 420.

RJ45 connector 470 accepts connection of a communication cable (for example, an Ethernet® cable and ISDN (Integrated Services Digital Network)) and other cables.

Plug 480 is inserted in a wall outlet (not shown) provided in a wall surface of house 10 and receives supply of electric power through electric wire 190. In addition, plug 480 emits a signal transmitted from PLC modem 460 to power line 160.

Figure 5:
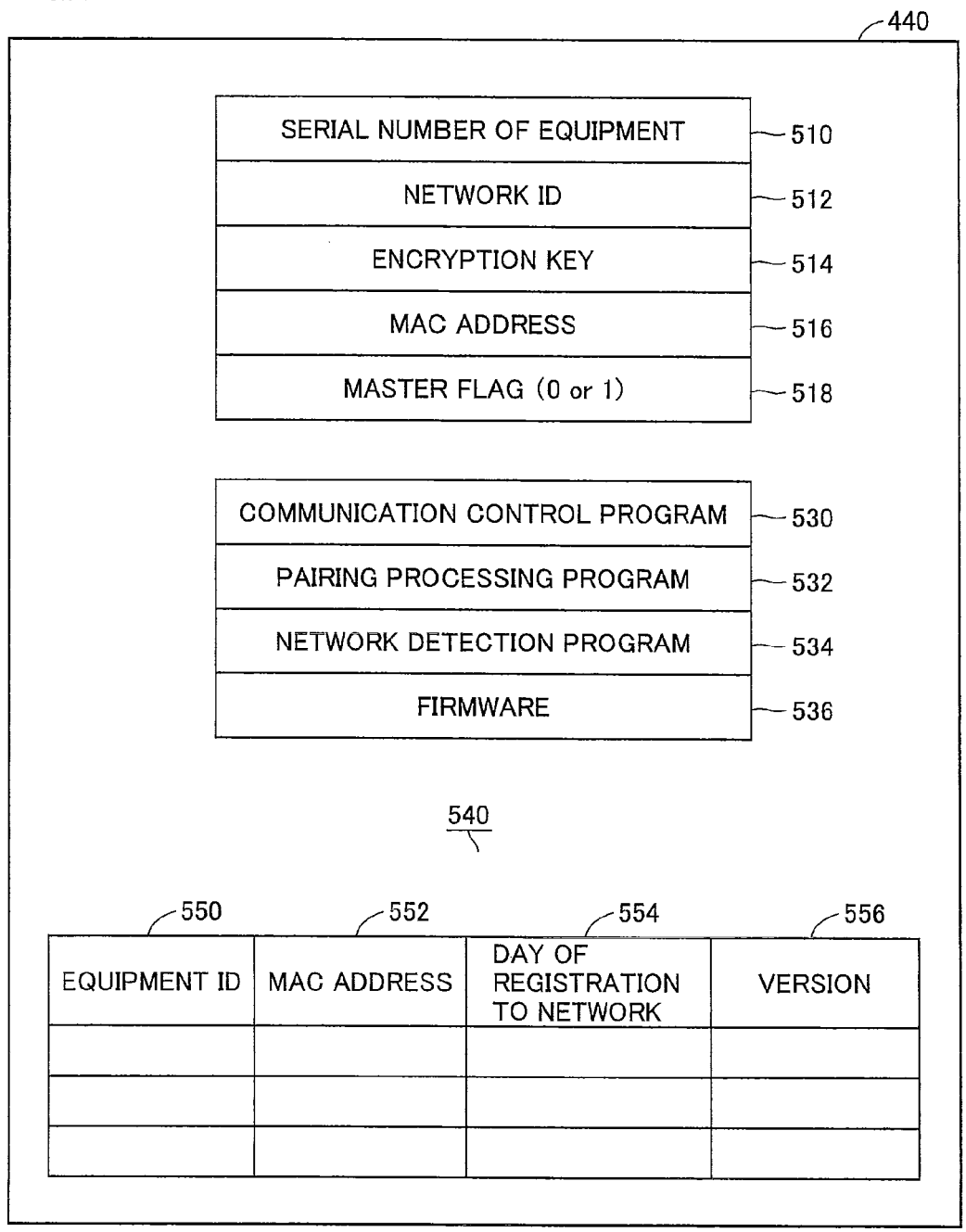
FIG. 5 is a diagram conceptually illustrating one form of storage of data in a flash memory 440.

Referring next to FIG. 5, a data structure of communication device 110 will be described. FIG. 5 is a diagram conceptually illustrating one form of storage of data in flash memory 440. Flash memory 440 includes a plurality of memory areas for storing data.

A serial number of communication device 110 is stored in a memory area 510. A network ID (Identification) for identifying a network which communication device 110 joins is stored in a memory area 512. In the case where communication device 110 has not joined a specific network, "NULL" is stored in memory area 512, which indicates that no data is present therein.

An encryption key used when communication in house 10 is encrypted is stored in a memory area 514. The encryption key is obtained through communication by CPU 420 with another communication device (the device functioning as the master).

A MAC address is stored in a memory area 516. Data indicating whether communication device 110 is the device functioning as the master or not (master flag) is stored in a memory area 518. As will be described later, a value of the master flag may be changed with another communication device.

A communication control program executed when communication device 110 communicates through power line 160 is stored in a memory area 530. Processing implemented by the communication control program includes, for example, sending of a network ID and an encryption key, sending of a MAC address, generation of an identification code, communication with other communication devices, and the like.

A pairing processing program for pairing between communication device 110 and another communication device is stored in a memory area 532. When this program is executed, communication device 110 transmits a pairing request to a target communication device. When the pairing request is accepted by the target communication device, data necessary for pairing (such as network identification data) is transmitted from that device. Using that data, communication device 110 can join the network to which the target communication device belongs.

A network detection program for checking whether a network corresponding to the network ID registered in memory area 512 is present or not is stored in a memory area 534.

Firmware for operating each piece of hardware of communication device 110 is stored in a memory area 536.

In addition, when communication device 110 functions as the master, data for managing other communication devices is further held. Specifically, when communication device 110 functions as the master, flash memory 440 includes a table 540 for managing equipment information. Table 540 includes also areas 550, 552, 554, and 556. An equipment ID is stored in area 550. A MAC address is stored in area 552. Data indicative of time and day of registration of the equipment to the network is stored in area 554. Version information indicating equipment's status of joining the network is stored in area 556. Data stored in areas 550 to 556 are associated with one another.

Figure 6:
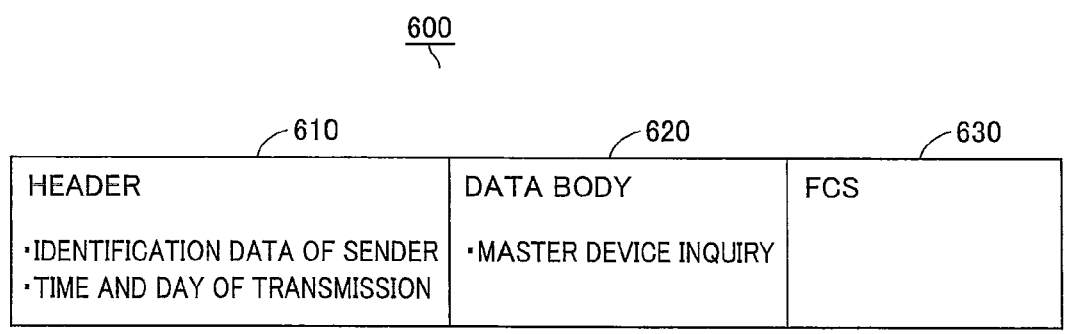
FIG. 6 is a diagram conceptually illustrating a configuration of a frame 600 transmitted from communication device 110 for inquiry for a master.

Referring next to FIG. 6, a frame 600 transmitted from communication device 110 for inquiry for a master will be described. FIG. 6 is a diagram conceptually illustrating a configuration of frame 600. Frame 600 includes a header 610, a data body 620, and an FCS (Frame Check Sequence) 630. Frame 600 is generated, for example, by CPU 420 functioning as master detection unit 324.

Header 610 includes identification data of a communication device which is a sender of frame 600, time and day of transmission of frame 600, and predetermined control data for communication of frame 600, Data body 620 includes a request representing inquiry for a master. FCS 630 includes data for checking whether frame 600 is a normally transmitted signal or not.

When frame 600 is transmitted from communication device 110-4, other communication devices 110-1, 110-2 and 110-3 connected to power line 160 receive frame 600 and perform processing for checking the request included in data body 620.

Figure 7:
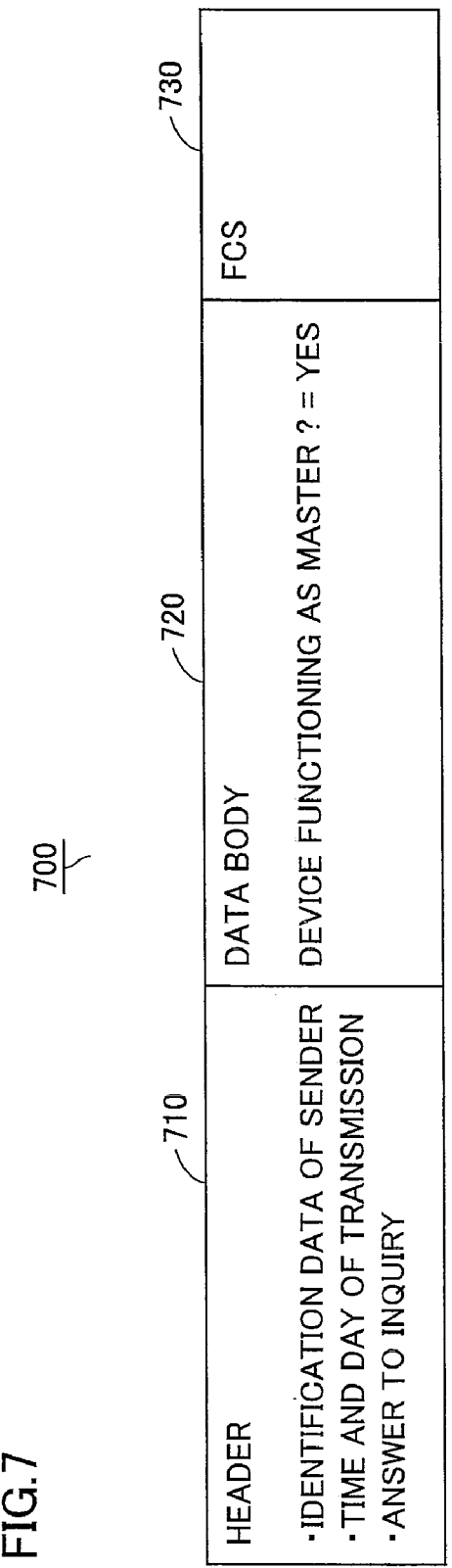
FIG. 7 is a diagram conceptually illustrating a configuration of a frame 700 sent from a communication device that received a request to a device that transmitted frame 600.

Referring now to FIG. 7, a frame 700 sent from the communication device that received the request to the communication device that transmitted frame 600 will be described. FIG. 7 is a diagram conceptually illustrating a configuration of frame 700. Frame 700 includes a header 710, a data body 720, and an FCS 730.

Header 710 includes data for identifying a communication device which is a sender of frame 700, time and day of transmission of frame 700, and control data meaning that this frame indicates an answer to the inquiry included in frame 600. Data body 720 includes data indicating whether the communication device which is the sender of frame 700 is the device functioning as the master or not. The data is implemented, for example, as a binary signal defined by 0 or 1. FCS 730 includes data similar to the data included in FCS 630 shown in FIG. 6.

In the example shown in FIG. 1A, when communication device 110-4 transmits frame 600, communication devices 110-1, 110-2 and 110-3 receive frame 600. Each of communication devices 110-1, 110-2 and 110-3 checks whether the communication device itself functions as the master or not, in response to obtaining of the request stored in frame 600 (data body 620). Communication devices 110-1, 110-2 and 110-3 generate frame 700 containing a result of checking (data body 720) and transmit frame 700 to communication device 110-4.

Here, when any communication device functions as the master, data body 720 of frame 700 transmitted from that device includes the data indicating that the device functions as the master. Data body 720 of frame 700 sent from other devices includes data different from the data used for the device above.

Figure 8:
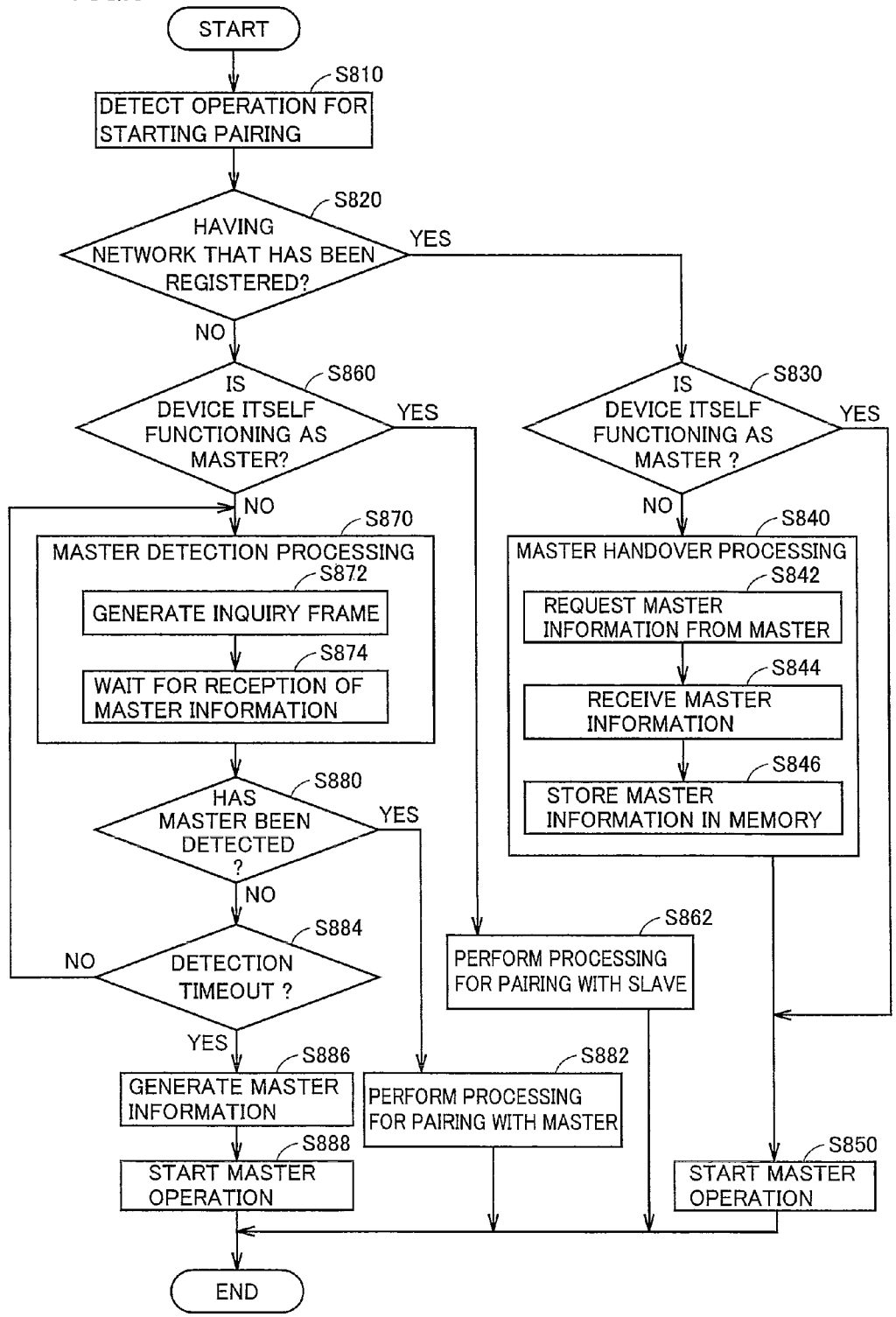
FIG. 8 is a flowchart illustrating a series of operations for communication device 110 to perform a master operation or pairing processing.

Referring to FIG. 8, a control structure of communication device 110 according to the present embodiment will be described. FIG. 8 is a flowchart illustrating a series of operations for communication device 110 to perform a master operation or pairing processing.

In step S810, CPU 420 senses that the operation for starting pairing of communication device 110 was performed, based on a signal sent from manipulation panel 410.

In step S820, CPU 420 checks whether communication device 110 has a network that has already been registered or not, by referring to flash memory 440. Specifically, CPU 420 checks whether a network ID has been stored or not, by referring to memory area 512. When CPU 420 determines that communication device 110 has the network that has already been registered (YES in step S820), CPU 420 switches control to step S830. Otherwise (NO in step S820), CPU 420 switches control to step S860.

In step S830, CPU 420 checks whether communication device 110 itself functions as the master or not. This determination is made, for example, based on a value of the master flag stored in memory area 518. When CPU 420 determines that communication device 110 functions as the master (YES in step S830), CPU 420 switches control to step S850. Otherwise (NO in step S830), CPU 420 switches control to step S840.

In step S840, CPU 420 performs master handover processing. Specifically, in step S842, CPU 420 requests master information from the communication device functioning as the master. The master information includes the ID of the network to which communication device 110 is connected and an encryption key and/or a decryption key for encrypted communication between communication device 110 and another communication device. Another communication device that received the request transmits the master information to communication device 110, if it has the master information.

In step S844, CPU 420 senses reception of the master information transmitted in response to the request, from the communication device functioning as the master. Specifically, CPU 420 obtains the master information from the signal sent through PLC modem 460 and causes RAM 430 to temporarily store the master information in an area secured therein.

In step S846, CPU 420 causes flash memory 440 to store the data stored in RAM 430 in an area secured therein (memory areas 512, 514 and 516). In addition, CPU 420 sets the value of the master flag in memory area 518 to 1.

In step S850, CPU 420 starts a master operation for causing communication device 110 to function as the master. Specifically, CPU 420 waits for reception of a pairing request sent from another communication device. When the reception of the pairing request is sensed, CPU 420 performs pairing processing for causing another communication device to join the network in response to the request. CPU 420 transmits the network ID (memory area 512), the encryption key (memory area 514), and the MAC address (memory area 516) stored in flash memory 440 to that device.

In step S860, CPU 420 checks whether communication device 110 functions as the master or not. This processing is the same as the processing performed in step S830. When CPU 420 determines that communication device 110 functions as the master (YES in step S860), CPU 420 switches control to step S862. Otherwise (NO in step S860), CPU 420 switches control to step S870.

In step S862, CPU 420 performs processing for pairing with another device functioning as the slave.

In step S870, CPU 420 performs master detection processing. Specifically, in step S872, CPU 420 serves as master detection unit 324 to generate frame 600 for inquiry for the master on the network. CPU 420 transmits frame 600 to power line 160 through PLC modem 460. In step S874, CPU 420 waits for the reception of frame 700 sent back in response to frame 600. More specifically, CPU 420 waits for the reception of frame 700 including data indicating that the sender of frame 700 is the device functioning as the master.

In step S880, CPU 420 determines whether the master was detected or not, based on frame 700 received through PLC modem 460. When CPU 420 determines that the master was detected (YES in step S880), CPU 420 switches control to step S882. Otherwise (NO in step S880), CPU 420 switches control to step S884.

In step S882, CPU 420 performs processing for pairing with the communication device functioning as the master detected based on frame 700. When this processing is performed, communication device 110 obtains the network ID, the encryption key and the MAC address, and causes flash memory 440 to store the obtained data in memory areas 512, 514, 516 therein. In addition, CPU 420 sets the value of the master flag in memory area 518 to 0.

In step S884, CPU 420 determines timeout of detection of the master. This determination is made based on time data from an internal clock (not shown) in CPU 420. When CPU 420 determines the detection timeout (YES in step S884), CPU 420 switches control to step S886. Otherwise (NO in step S884), CPU 420 returns control to step S870.

In step S886, CPU 420 generates the master information for communication through power line 160, based on the data stored in flash memory 440. Specifically, CPU 420 generates the master information based on data input in advance by the user of communication device 110. Here, the data input in advance includes data determined by the user for identifying the network constituted of power line 160, initial data for determining a MAC address of each communication device constituting the network, and the like. When CPU 420 generates such master information, CPU 420 causes the data to be stored in memory areas 512, 514 and 516. In addition, CPU 420 sets the value of the master flag in memory area 518 to 1.

In step S888, CPU 420 starts the master operation. When this operation is started, the data obtained from another device that communicated with communication device 110 is successively written in table 540.

Figure 9:
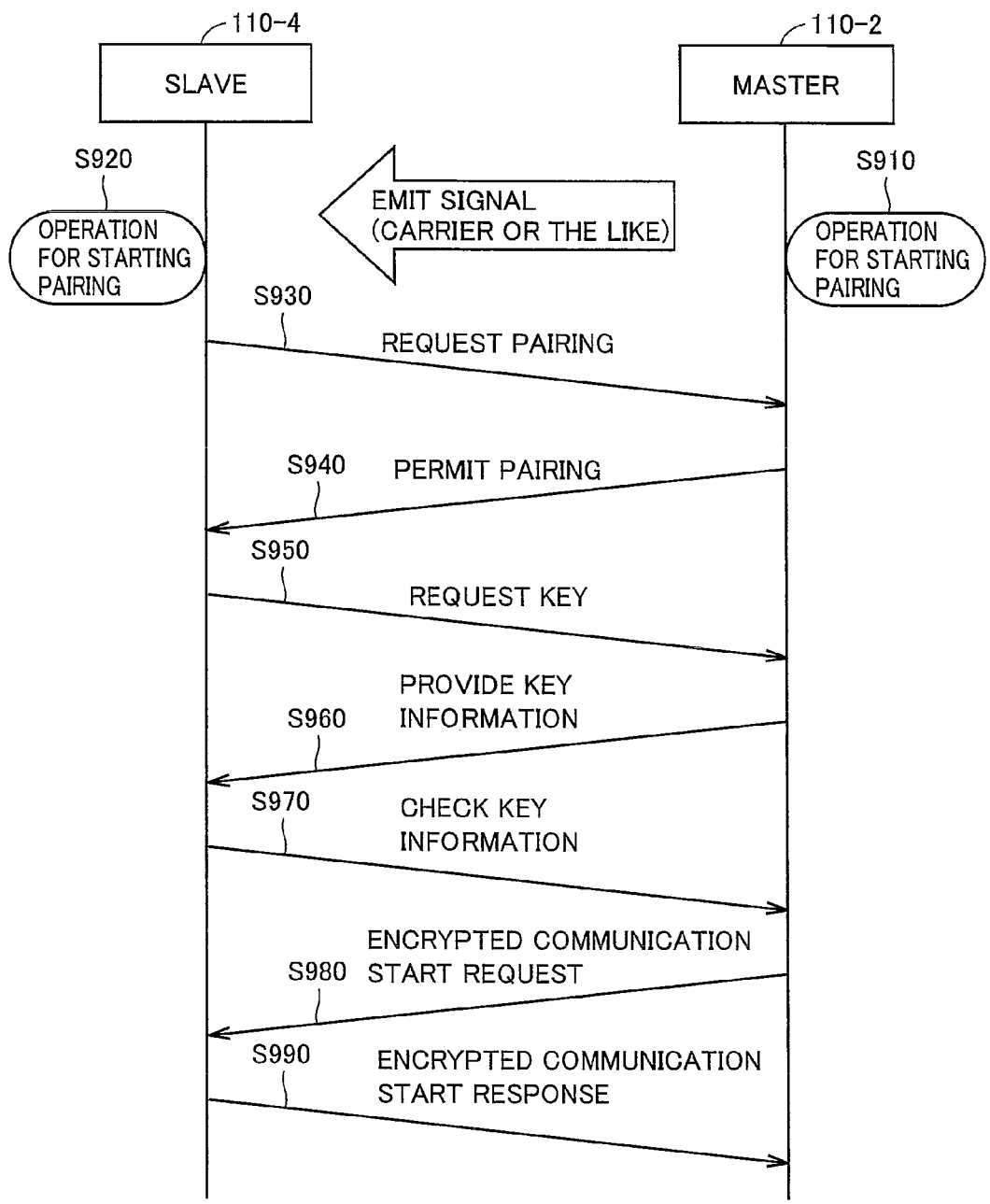
FIG. 9 is a sequence chart illustrating a flow of the pairing processing performed between a communication device 110-2 and a communication device 110-4.

Referring now to FIG. 9, the pairing processing performed between two communication devices will be described. FIG. 9 is a sequence chart illustrating a flow of the pairing processing performed between communication device 110-2 and communication device 110-4 in FIG. 1B. Communication device 110-2 functions as the master, while communication device 110-4 functions as the slave, that is, as a terminal requesting joining the network.

It is noted that communication device 110-2 and communication device 110-4 are both implemented as communication device 110 shown in FIG. 4.

In step S910, communication device 110-2 functioning as the master senses that the operation for starting pairing was performed, based on the operation of manipulation panel 410.

In step S920, communication device 110-4 functioning as the slave senses that manipulation for starting pairing was performed, based on the operation of manipulation panel 410. It does not matter which one of the timing of processing in step S910 and the timing of processing in step S920 is earlier than the other.

In step S930, communication device 110-4 generates a signal indicating the pairing request in response to the operation for starting pairing and transmits the generated signal to communication device 110-2. Communication device 110-2 that received the request authenticates communication device 110-4 and determines permission/rejection of pairing.

In step S940, communication device 110-2 generates a signal indicating permission of pairing and transmits the signal to slave 110-4. In step S950, communication device 110-4 functioning as the slave generates a signal requesting key information for establishing the network between communication device 110-4 and communication device 110-2 and transmits the generated signal to communication device 110-2. Here, the key information includes the network ID, the encryption key, the MAC address, and data for identifying communication device 110-2.

In step S960, communication device 110-2 reads the key information from flash memory 440 in response to reception of the request signal, generates a signal including that information, and transmits the generated signal to communication device 110-4. Receiving the key information, communication device 110-4 causes flash memory 440 to store each piece of information in an area secured in advance therein (such as memory areas 512 to 516).

In step S970, communication device 110-4 generates a frame including the received key information and transmits the generated frame to communication device 110-2. Communication device 110-2 extracts each piece of information from the received frame and checks whether or not the information is the same as the key information sent to communication device 110-4.

In step S980, communication device 110-2 generates a request for starting encrypted communication and transmits the request to communication device 110-4.

In step S990, communication device 110-4 encrypts data to be transmitted, by using the encryption key (memory area 514) in response to reception of the request, and transmits the signal generated as a result of encryption to communication device 110-2. Subsequent communication is encrypted by using the encryption key and subsequently decrypted.

Figure 10:
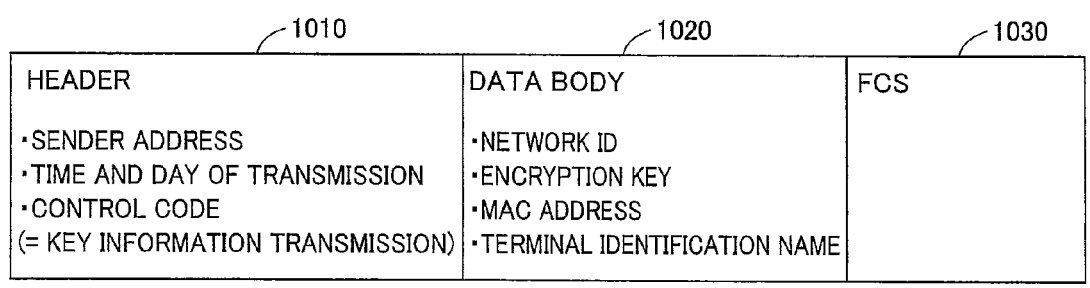
FIG. 10 is a diagram conceptually illustrating a configuration of a frame 1000 sent from communication device 110-2 functioning as a master to communication device 110-4 functioning as a slave.

Referring now to FIG. 10, a frame 1000 for transmitting the key information will be described. FIG. 10 is a diagram conceptually illustrating a configuration of frame 1000 sent from communication device 110-2 functioning as the master to communication device 110-4 functioning as the slave. Frame 1000 includes a header 1010, a data body 1020, and an FCS 1030.

Header 1010 includes an address of communication device 110-2 which is a sender of frame 1000, time and day of transmission of frame 1000, and a control code representing an attribute of frame 1000 (for example, a code defined in advance, which means "key information transmission").

Data body 1020 includes a network ID, an encryption key, a MAC address, and a terminal identification name (that is, the data for identifying communication device 110-2). FCS 1030 has, for example, data items as in FCS 630 shown in FIG. 6.

As described above, according to the communication system of the present embodiment, communication device 110-2 that has been functioning as the slave now functions as the master based on a pairing instruction provided to each of communication device 110-2 and communication device 110-4. Specifically, communication device 110-2 obtains as the data for establishing communication network 100, network identification data of communication network 100 and the encryption key for encrypted communication over communication network 100 from communication device 110-1. Communication device 110-1 changes its status from the "master" to the "slave". Specifically, the value of the master flag is changed from 1 to 0.

Communication device 110-2 receives the pairing request from communication device 110-4. Communication device 110-2 associates the data for identifying communication device 110-4 included in the pairing request and the network identification data for identifying communication network 100 with each other. Thus, communication device 110-4 will be controlled by communication device 110-2 that manages communication over communication network 100.

In addition, communication device 110-2 transmits the network identification data and the encryption key to communication device 110-4. Receiving the network identification data and the encryption key, communication device 110-4 causes the memory to store such received data. Thus, communication device 110-4 can communicate as the slave in communication network 100, with other communication devices 110-1 and 110-3 in addition to communication device 110-2, under monitoring by communication device 110-2.

In addition, according to the communication device of the present embodiment, when another communication terminal functioning as the master is not detected, data for the communication device itself to function as the master can be generated. Thus, a communication network in which other communication terminals serve as slaves is readily established.

As can clearly be seen from the above, in the communication system according to the present embodiment, the manager of the communication system (for example, a resident of house 10) can perform an operation for starting pairing processing between communication device 110-4 of which addition to communication network 100 is desired and communication device 110-2 which is a device that has already constituted communication network 100 and is located closest to communication device 110-4. The manager can quickly perform the pairing processing by using communication device 110-2 located closest to a place where communication device 110-4 is provided, without moving to a place where communication device 110-1 serving as the master is located.

Second Embodiment

A second embodiment of the present invention will be described hereinafter. A communication device 1100 according to the present embodiment is different from communication device 110 according to the first embodiment in having a function to request data for implementing a function as the master from another communication device functioning as the master. The data for implementing the function includes, for example, network identification data and an encryption key.

Figure 11:
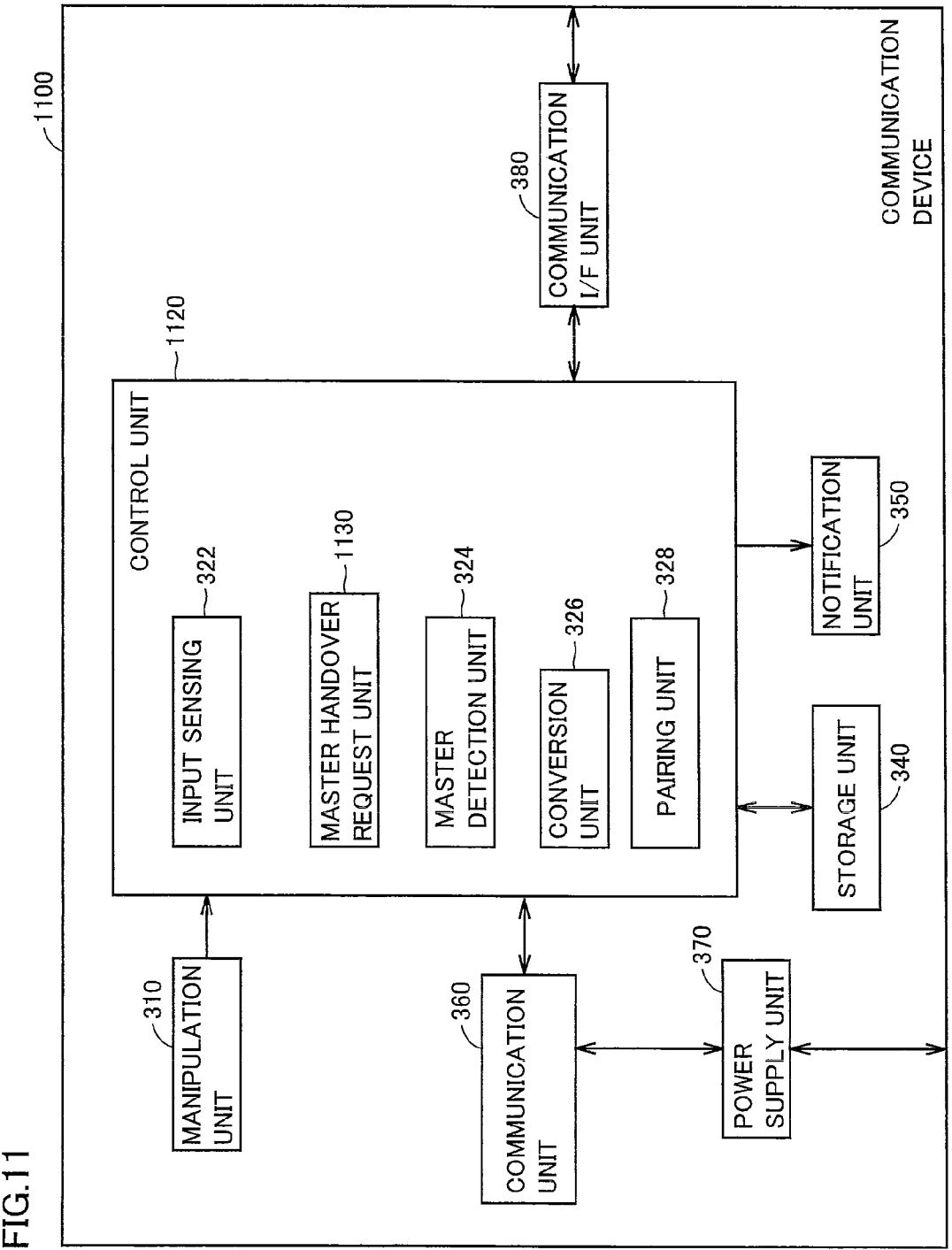
FIG. 11 is a block diagram illustrating a configuration of a function realized by a communication device 1100.

Referring now to FIG. 11, a configuration of communication device 1100 will be described. FIG. 11 is a block diagram illustrating a configuration of a function realized by communication device 1100. Communication device 1100 includes a control unit 1120 instead of control unit 320, as compared with the configuration shown in FIG. 3. Control unit 1120 further includes a master handover request unit 1130 in addition to input sensing unit 322, master detection unit 324, conversion unit 326, and pairing unit 328.

Master handover request unit 1130 requests data for functioning as the master (a network ID, an encryption key, a MAC address, and change of the master flag) from another communication device functioning as the master, based on a result of detection by master detection unit 324. Specifically, when master handover request unit 1130 generates a signal requesting change of the status of the master, it transmits the generated signal from power supply unit 370 to power line 160 through communication unit 360. Another communication device that received this signal checks whether the communication device itself functions as the master or not. When any communication device confirms that the communication device itself functions as the master, the master flag is changed. The master flag is changed from the value indicating the master to the value not indicating the master. The device transmits the network ID, the encryption key, and the MAC address to communication device 1100. It is noted that data items may individually be transmitted or included in an identical frame.

By pairing communication device 1100 shown in FIG. 11 with another communication device, communication device 1100 that did not function as the master before pairing can now function as the master after the start of pairing. Therefore, the user who desires to add a new communication device to the existing network can perform pairing processing between communication device 1100 functioning as the master and a new communication device. Consequently, change of network setting can readily be made.

Figure 12:
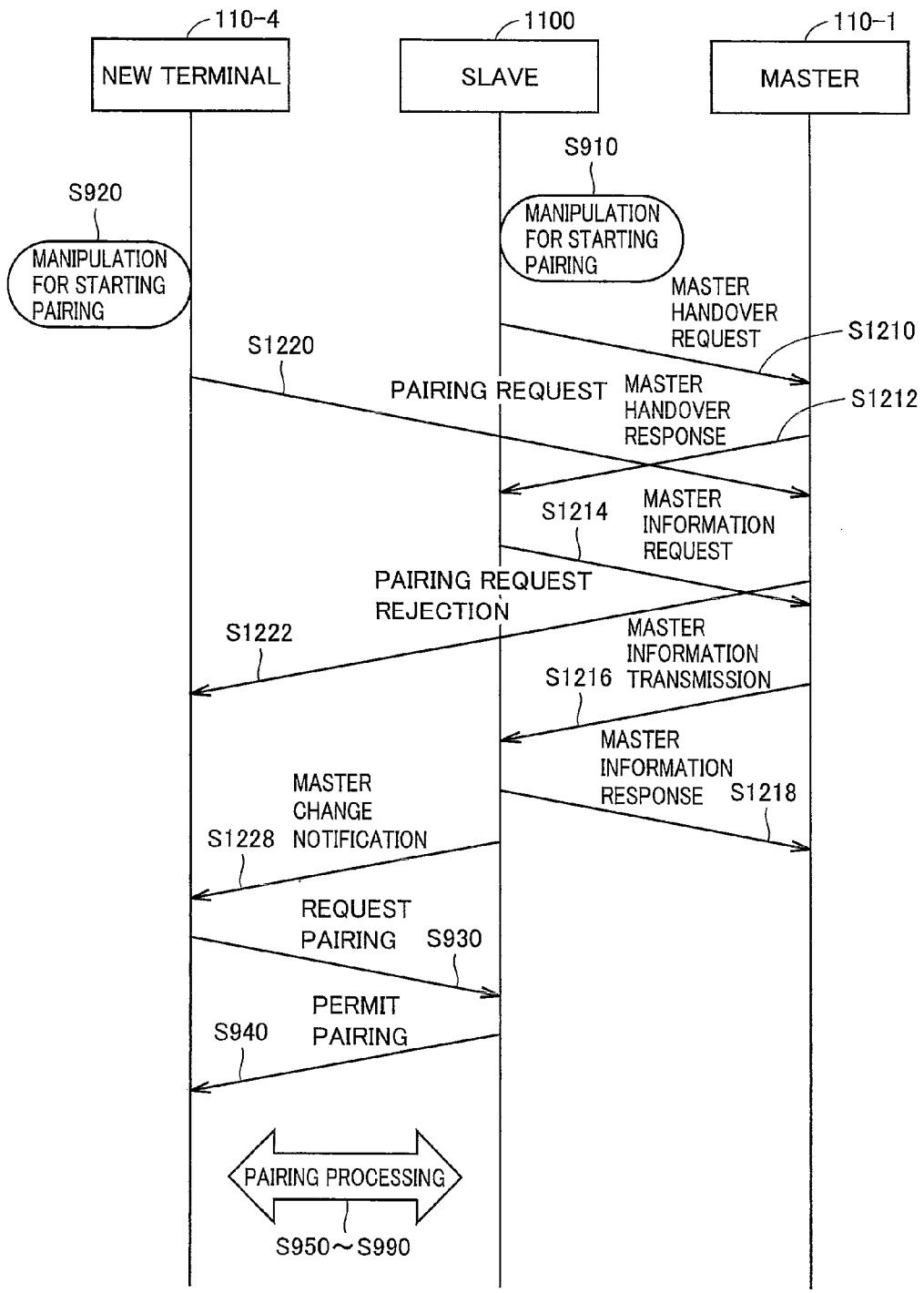
FIG. 12 is a sequence chart illustrating processing performed when a terminal is newly added to a network constituted of two communication devices.

Referring now to FIG. 12, pairing in the communication network according to the present embodiment will be described. FIG. 12 is a sequence chart illustrating processing performed when a terminal is newly added to a network constituted of two communication devices. It is noted that the processing the same as that in the first embodiment has the same step number allotted and hence description thereof will not be repeated. Here, an example where communication device 1100 and communication device 110-1 have already established the network and communication device 110-4 newly joins the network will be described.

In step S1210, communication device 1100 generates a master handover request signal based on the operation for starting pairing of manipulation panel 410 (step S910) and transmits the generated signal to communication device 110-1 currently functioning as the master. In step S1212, communication device 110-1 transmits a response signal indicating acceptance of change of the master to communication device 1100, based on reception of that signal.

In step S1214, communication device 1100 generates a signal requesting master information based on reception of the response signal and transmits the signal to communication device 110-1.

In step S1216, communication device 110-1 reads the master information (the network ID, the encryption key, and the MAC address) stored in flash memory 440 based on reception of that signal, generates a frame for transmission, and transmits the generated frame to communication device 1100. In addition, communication device 110-1 changes the value of the master flag (memory area 518) from the data indicating the master (for example, "1") to the data indicating the slave (for example, "0"), in accordance with transmission of the master information. Thereafter, communication device 110-1 can no longer function as the master but functions as the slave. Communication device 110-1 temporarily loses the function to control other communication devices. When the pairing processing subsequently ends, communication device 110-1 obtains information for functioning as the master from communication device 1100. Alternatively, in another aspect, communication device 110-1 may function as the slave without functioning as the master. Here, communication device 1100 continues to function as the master.

In step S1218, communication device 1100 gives a notification that the master information sent from communication device 110-1 is stored in the area secured in advance in flash memory 440. Thereafter, communication device 1100 functions as the master.

In step S1220, communication device 110-4 to newly be added to the network transmits the pairing request to communication device 110-1, based on manipulation for starting pairing. On the other hand, as communication device 110-1 has already transmitted the response signal indicating acceptance of change of the master (step S1212), communication device 110-1 generates a signal indicating rejection of the pairing request.

In step S1222, communication device 110-1 transmits the generated signal to communication device 110-4. Receiving the signal, communication device 110-4 senses that communication device 110-1 is not functioning as the master.

In step S1228, communication device 1100 transmits to communication device 110-4, a notification that the device to function as the master has been changed from communication device 110-1 to communication device 1100. Communication device 110-4 senses that communication device 1100 is functioning as the master, based on reception of the notification. In step S930, communication device 110-4 again generates the signal requesting pairing and transmits the signal to communication device 1100. At this time point, as communication device 1100 can function as the master, communication device 1100 performs authentication processing defined in advance based on reception of the pairing request, and thereafter transmits permission of pairing to communication device 110-4 (step S940). Thereafter, the pairing processing as described previously (steps S950 to S990) is performed.

Figure 13:
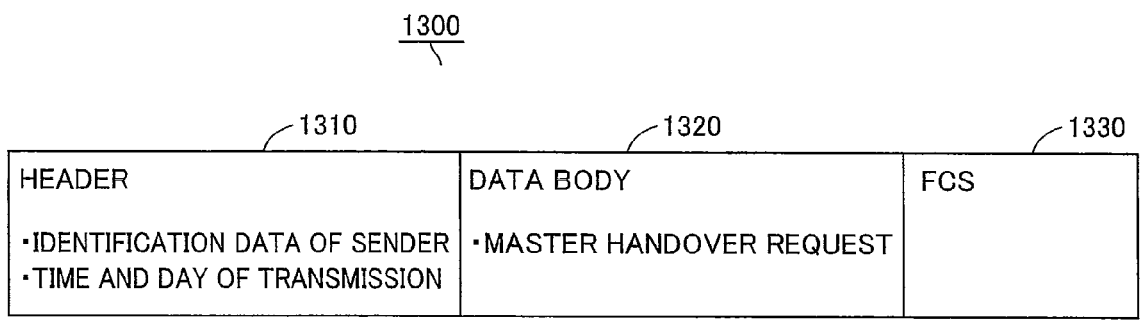
FIG. 13 is a diagram illustrating a frame 1300 sent from communication device 1100 functioning as the slave to a communication device 110-1 functioning as the master.
Figure 14:
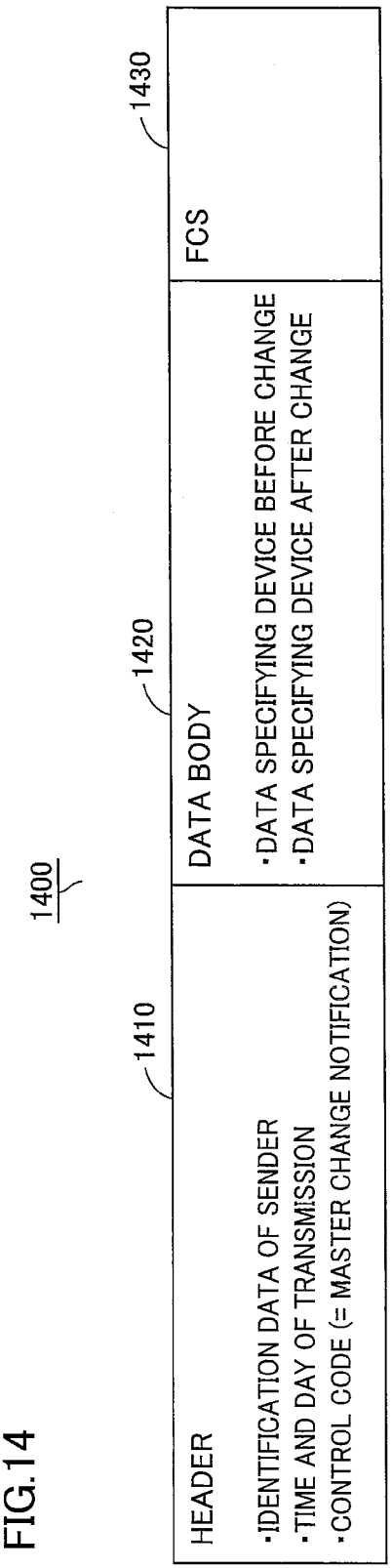
FIG. 14 is a diagram illustrating a configuration of a frame 1400 indicating that a device functioning as the master has been changed.

Referring now to FIGS. 13 and 14, a frame transmitted when the master is changed will be described. FIG. 13 is a diagram illustrating a master handover request frame 1300 sent from communication device 1100 functioning as the slave to communication device 110-1 functioning as the master. Frame 1300 includes a header 1310, a data body 1320, and an FCS 1330. Header 1310 includes data for identifying a sender of frame 1300 (communication device 1100) and time and day of sending of frame 1300. Data body 1320 includes a master handover request. Specifically, the communication device that received the request (for example, communication device 110-1) refers to information stored in flash memory 440, and when that device functions as the master, the device requests transmission of data for that purpose to the sender of frame 1300. FCS 1330 has data similar to the data included in FCS 630 shown in FIG. 6.

FIG. 14 is a diagram illustrating a configuration of a frame 1400 indicating that a device functioning as the master has been changed. Frame 1400 includes a header 1410, a data body 1420, and an FCS 1430. Header 1410 includes data for identifying a sender of frame 1400 (for example, communication device 1100), time and day of transmission of frame 1400, and a control code representing an attribute of frame 1400. The control code means, for example, that frame 1400 gives notification of change of the master.

Data body 1420 includes data for specifying the master before change and data for specifying the master after change. In the example shown in FIG. 14, the data for specifying the master before change corresponds to the data for identifying communication device 110-1. The data for specifying the master after change corresponds to the data for identifying communication device 1100. FCS 1430 includes data items similar to those in FCS 630 shown in FIG. 6.

As described above, according to the communication system of the second embodiment of the present invention, when pairing processing between the communication device that has established the communication network and is not functioning as the master and the communication terminal to newly be added to the communication network is performed, the communication terminal obtains data for functioning as the master from the communication device functioning as the master. Thereafter, the communication device that provided the data will function as the slave.

Consequently, a communication terminal can readily be added to the communication network constituted of these communication devices.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A communication device for communicating with another communication terminal connected to a power line, comprising:
   a communication unit configured to communicate with said another terminal; and
   a controller configured to perform pairing processing for establishing a communication network with a new communication apparatus,
   wherein said controller is configured to:
   determine, based on an instruction to start the pairing processing, whether or not said communication device functions as a master device;
   obtain master information necessary for functioning as the master device from another terminal connected to the power line, when it is determined that the communication device does not function as the maser device; and
   perform the pairing processing with the new communication apparatus when the master information is obtained.

2. The communication device according to claim 1, wherein
   said controller is configured to:
   confirm whether or not a network is registered in the communication device; and
   determine whether or not the communication device functions as the master device when the network is registered in the communication device.

3. The communication device according to claim 2, wherein
   said controller is further configured to:
   detect a master device from the communication network when a network is not registered in the communication device; and
   perform pairing process with the detected master device.

4. The communication device according to claim 3, wherein said controller is further configured to generate the master information necessary for functioning as the master device, based on data stored in the communication device, when a master device is not detected from the communication network.

5. The communication device according to claim 1, further comprising an input unit configured to accept an instruction provided to the communication device, as an instruction to start the pairing processing, wherein
said controller is configured to determine whether or not the communication device functions as the master device, based on the instruction provided to the communication device.

6. A method for controlling a communication device for communicating with another communication terminal connected to a power line, comprising: performing pairing processing for establishing a communication network with a new communication apparatus;
   determining, based on an instruction to start the pairing processing, whether or not said communication device functions as a master device;
   obtaining master information necessary for functioning as the master device from another terminal connected to the power line, when it is determined that the communication device does not function as the master device; and
   performing the pairing processing with the new communication apparatus when the master information is obtained.

7. The method according to claim 6, further comprising
   confirming whether or not a network is registered in the communication device; and
   determining whether or not the communication device functions as the master device when the network is registered in the communication device.

8. The method according to claim 7, further comprising:
   detecting a master device from the communication network when the network is not registered in the communication device; and
   performing the pairing processing with the detecting master device.

9. The method according to claim 8, further comprising:
   generating the master information necessary for functioning as the master device, based on data stored in the communication device, when a master device is not detected from the communication network.

10. The method according to claim 6, further comprising:
    accepting an instruction provided to the communication device, as an instruction to start the pairing processing, wherein
    said determining includes determining whether or not the communication device functions as the master device, based on the instruction provided to the communication device.

* * * * *